United States Patent [19]

Wilber

[11] Patent Number: 5,359,267
[45] Date of Patent: Oct. 25, 1994

[54] VERTICAL DEFLECTION WITH VERTICAL SHRINK MODE

[75] Inventor: James A. Wilber, Indianapolis, Ind.

[73] Assignee: Thomson Consumer Electronics, Inc., Indianapolis, Ind.

[21] Appl. No.: 115,612

[22] Filed: Sep. 3, 1993

[51] Int. Cl.$^5$ .................. H01J 29/70; H01J 29/76
[52] U.S. Cl. .................... 315/403; 315/397
[58] Field of Search .............. 315/403, 396, 397

[56] References Cited

U.S. PATENT DOCUMENTS

| | | | |
|---|---|---|---|
| 3,935,507 | 1/1976 | Wolber | 315/370 |
| 4,176,300 | 11/1979 | Waehner | 315/371 |
| 4,394,690 | 7/1983 | Kobayashi | 358/180 |
| 4,692,670 | 9/1987 | Imaizumi | 315/388 |
| 4,739,228 | 4/1988 | Viscardi et al. | 315/408 |
| 4,763,194 | 8/1988 | Osman | 358/180 |
| 4,766,355 | 8/1988 | Kadlec et al. | 315/399 |
| 4,864,405 | 9/1989 | Chambers | 358/180 |
| 5,229,692 | 7/1993 | Wilber | 315/371 |

FOREIGN PATENT DOCUMENTS

| | | |
|---|---|---|
| 63-26174 | 2/1988 | Japan . |
| 63-146672 | 6/1988 | Japan . |
| 63-185173 | 7/1988 | Japan . |
| 63-193779 | 8/1988 | Japan . |

OTHER PUBLICATIONS

An article entitled A New Video Processor For Color TV in the names of Yamamoto et al., dated 1988 and published by IEEE.
Appln. Ser. No. 911,421, filed Jul. 10, 1992 in the names of Wilber et al., entitled Vertical Deflection Arrangement for Zoom and Pan Features.
Appln. Ser. No. 911,683, filed Jul. 10, 1992 in the name of Wilber and entitled Picture Height Adjustment Arrangement for a Video Display.
Appln. Ser. No. 911,605, filed Jul. 10, 1992 in the name of Wilber and entitled Vertical Deflection Circuit for Zoom Mode Operation.
Data Sheet, TDA9151 Programmable deflection controller, Philips Semiconductors, Dec. 1991.
Appln. filed Jul. 14, 1993 in the name of Wilber and entitled A Vertical Deflection S-Correction with Picture Height Compensation.

*Primary Examiner*—Theodore M. Blum
*Attorney, Agent, or Firm*—Joseph S. Tripoli; Joseph J. Laks; Sammy S. Henig

[57] ABSTRACT

A differential amplifier formed by a pair of transistors couples a vertical sawtooth signal to an input side of a vertical deflection amplifier. Nonlinearity of the transistor pair provides S-correction in the vertical direction. The current in the transistor pair varies when vertical height is adjusted, in service operation, so that the nonlinearity changes. In a vertical shrink mode of operation, the amplitude of the sawtooth signal is reduced. The nonlinearity associated with a given level of the sawtooth signal that corresponds to a given vertical position in the vertical shrink mode is the same as that associated with the same level of the sawtooth signal in the vertical, non-shrink mode.

8 Claims, 10 Drawing Sheets

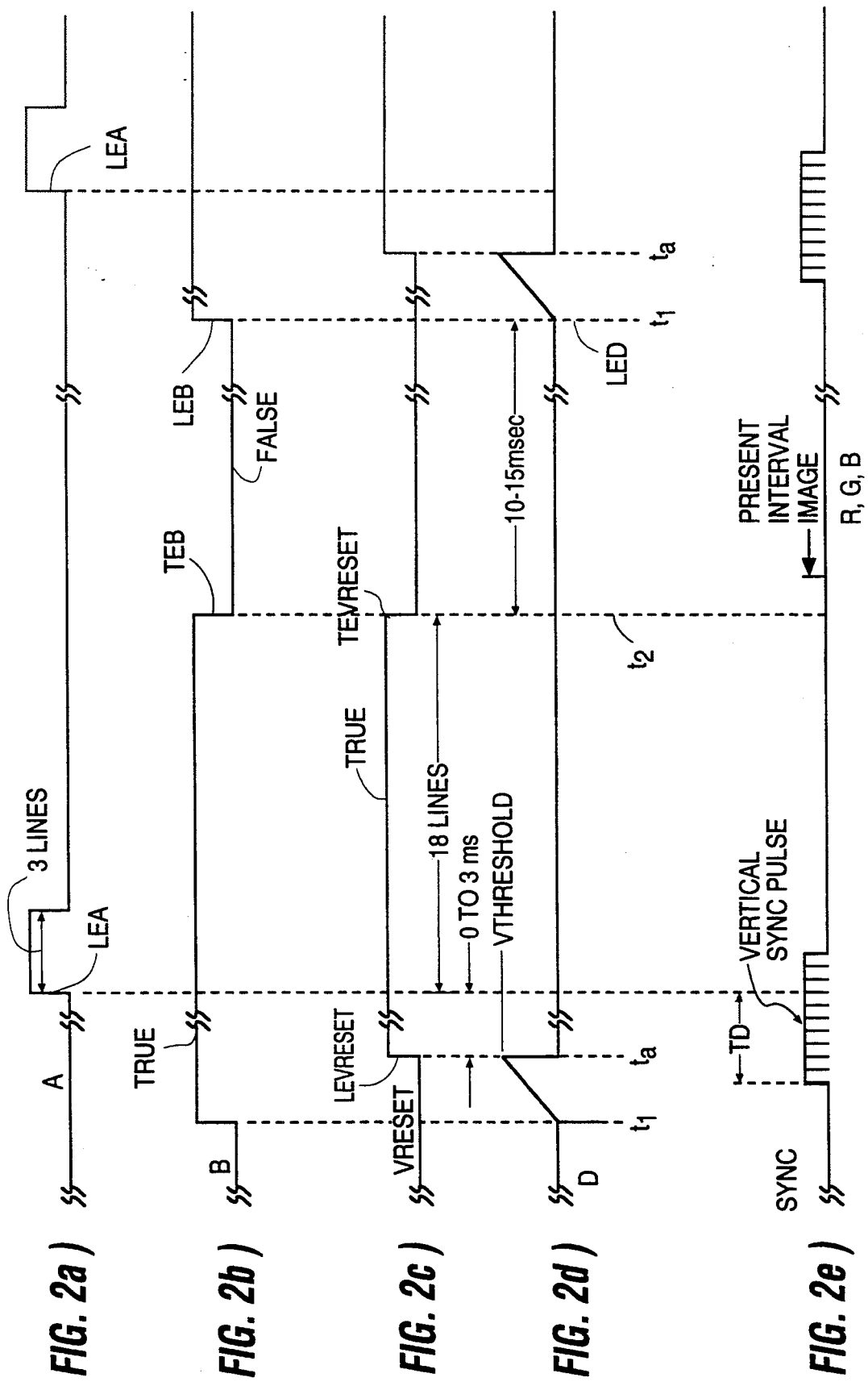

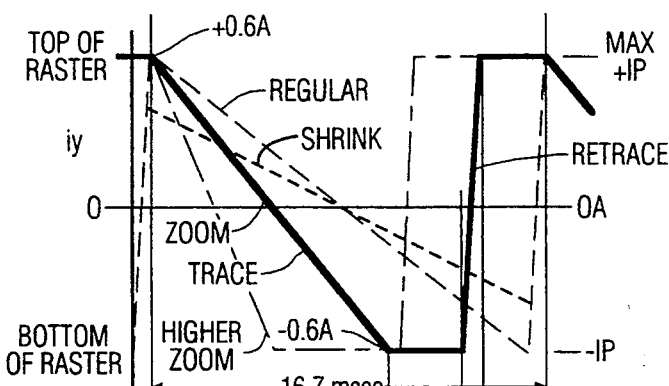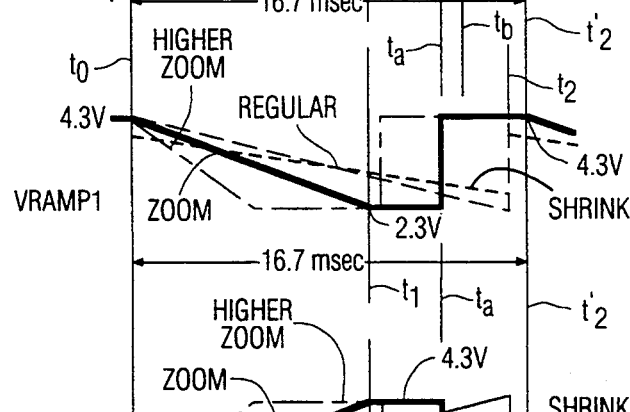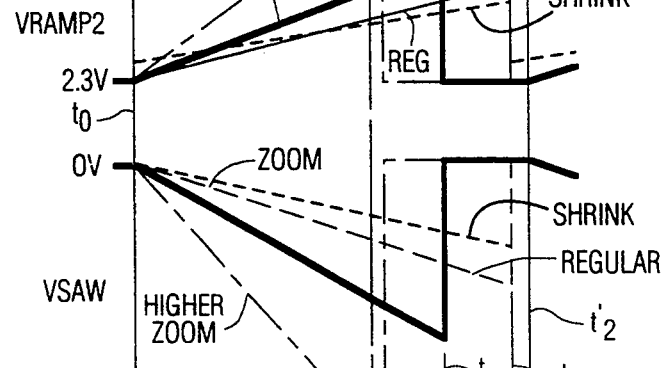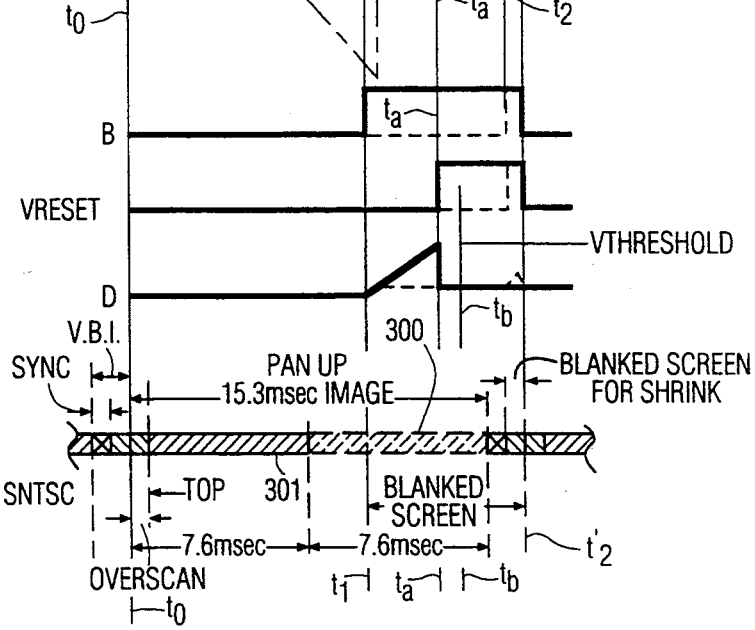

VERTICAL DEFLECTION WITH VERTICAL SHRINK MODE

The invention relates to a video display deflection apparatus.

Side by side pictures are an appealing feature for a television apparatus, especially one having a wide screen display. One can watch two programs simultaneously, with equal size pictures. This can be significantly more pleasing than a picture-in picture format, wherein a second picture overlays a main picture, and is quite small in display area by comparison to the main picture. However, side by side picture display formats can present a problem, even on a wide screen display, because significant amounts of subject matter might have to be cropped in order to avoid image aspect ratio distortion.

In a video display, embodying an aspect of the invention, a vertical deflection angle of the video display device is reduced when operating in the side-by-side display mode for reducing image aspect ratio distortion. This is accomplished by reducing the amplitude of a vertical deflection current in a vertical deflection, referred to herein as a vertical shrink mode.

It may be desirable to provide for S-correction in the vertical deflection current both in normal operation, when most of the entire height of the CRT display screen is utilized for picture display purposes, and in the vertical shrink mode, when the deflection angle is reduced for providing the aforementioned side-by-side display mode.

U.S. Pat. No. 5,229,692, entitled A VERTICAL DEFLECTION ARRANGEMENT WITH S-CORRECTION, in the name of Wilber discloses a differential amplifier formed by a pair of transistors having a nonlinear gain. The differential amplifier couples a vertical rate sawtooth signal to a vertical deflection winding and introduces nonlinearity in the deflection current in a manner to provide for S-correction. In, for example, service operation, picture height adjustment is obtained by varying the amplitude of the sawtooth signal. Adjustment of the picture height also causes the gain nonlinearity of the amplifier to be different at a given instantaneous value of the sawtooth signal for different picture height adjustment settings. The variation of the gain nonlinearity of the amplifier reduces changes in the nonlinearity of the deflection current that, otherwise, might be introduced as a result of the picture height adjustment.

It may be desirable to reduce the amplitude of the deflection current for operating in the side-by-side display mode and to utilize the nonlinearity of a transistor pair that form a differential amplifier to provide for S-correction. It may also be desirable to maintain the gain nonlinearity of the differential amplifier unaffected, at a given instantaneous value of the sawtooth signal, at each of the normal operation modes, when most of the entire CRT height is utilized for display purposes, and in the side-by-side display mode.

A video deflection apparatus, embodying an aspect of the invention, includes a cathode ray tube and a vertical deflection winding mounted on a neck of the cathode ray tube. A sawtooth signal generator is responsive to a first vertical size control signal for generating a first sawtooth signal, at a first amplitude to provide for a vertical non-shrink mode of operation and at a second amplitude to provide for a vertical shrink mode of operation. A deflection amplifier is responsive to the sawtooth signal for generating a vertical deflection current in the deflection winding that causes a vertical position of an electron beam on a display screen of the cathode ray tube to vary in accordance with the sawtooth signal. A nonlinear element is coupled to the sawtooth signal generator for varying the sawtooth signal in a nonlinear manner to provide for vertical S-correction. A nonlinearity introduced in the sawtooth signal by the nonlinear element is the same in a given vertical position in both the vertical shrink and non-shrink modes.

FIGS. 2a–2e illustrate idealized waveforms useful for explaining the timing functions of the arrangement of FIGS. 1a–1c;

FIGS. 3a–3f illustrate waveforms useful for explaining the operation of the arrangement of FIGS. 1a–1c when top panning is provided.

Figure 1A:
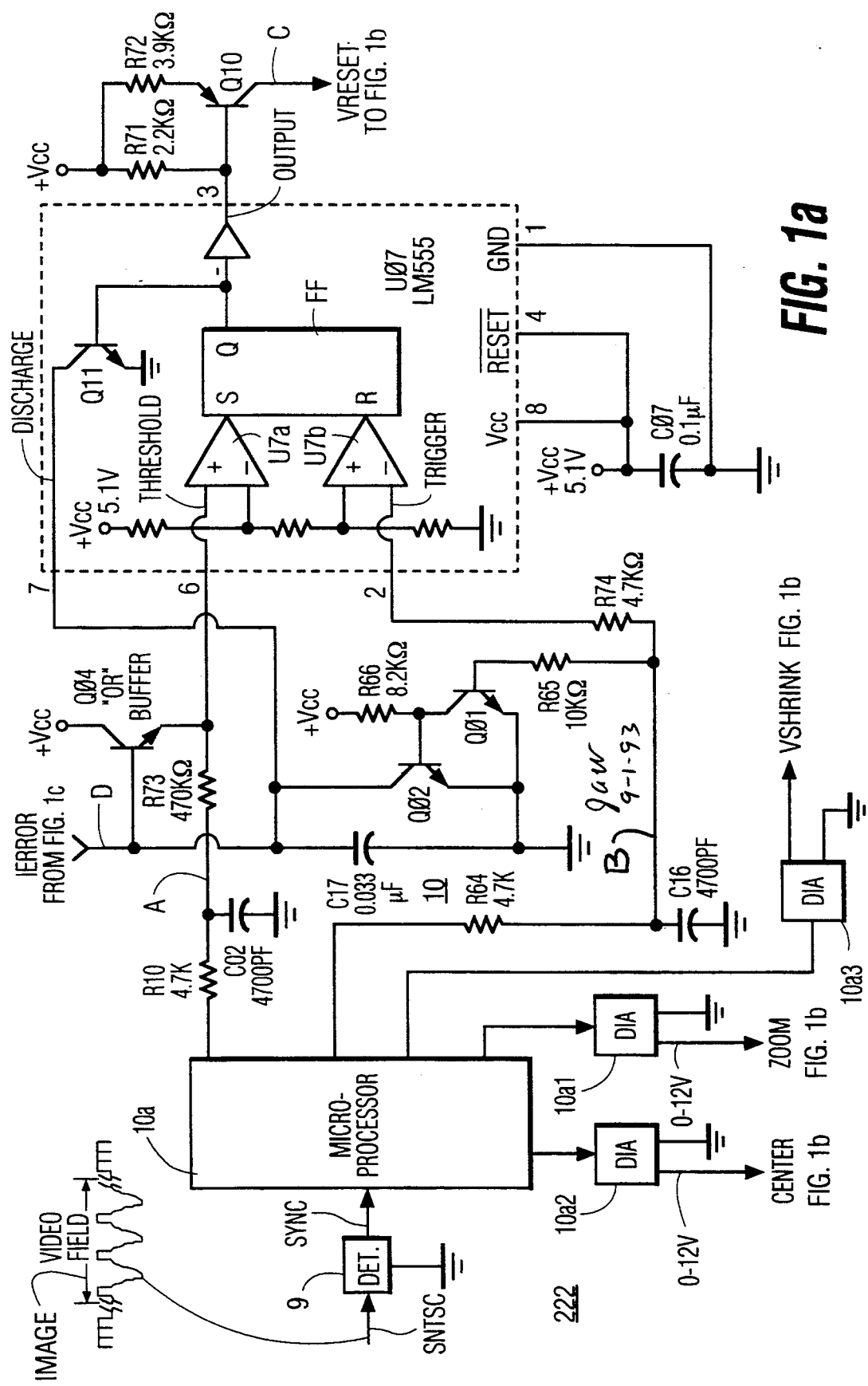
FIGS. 1a, 1b and 1c illustrate an inventive embodiment of a vertical deflection circuit.
Figure 1B:
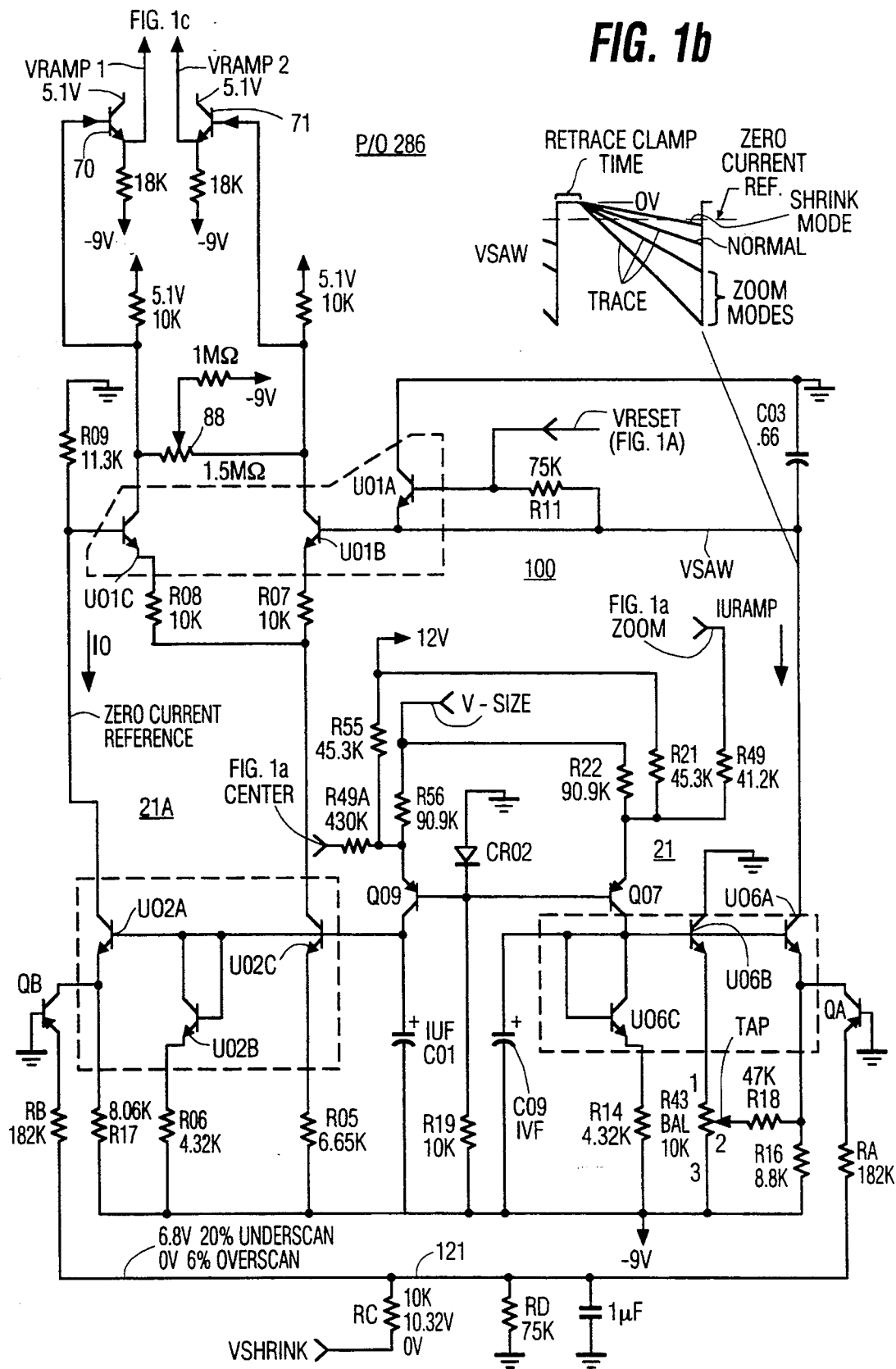
Figure 1C:
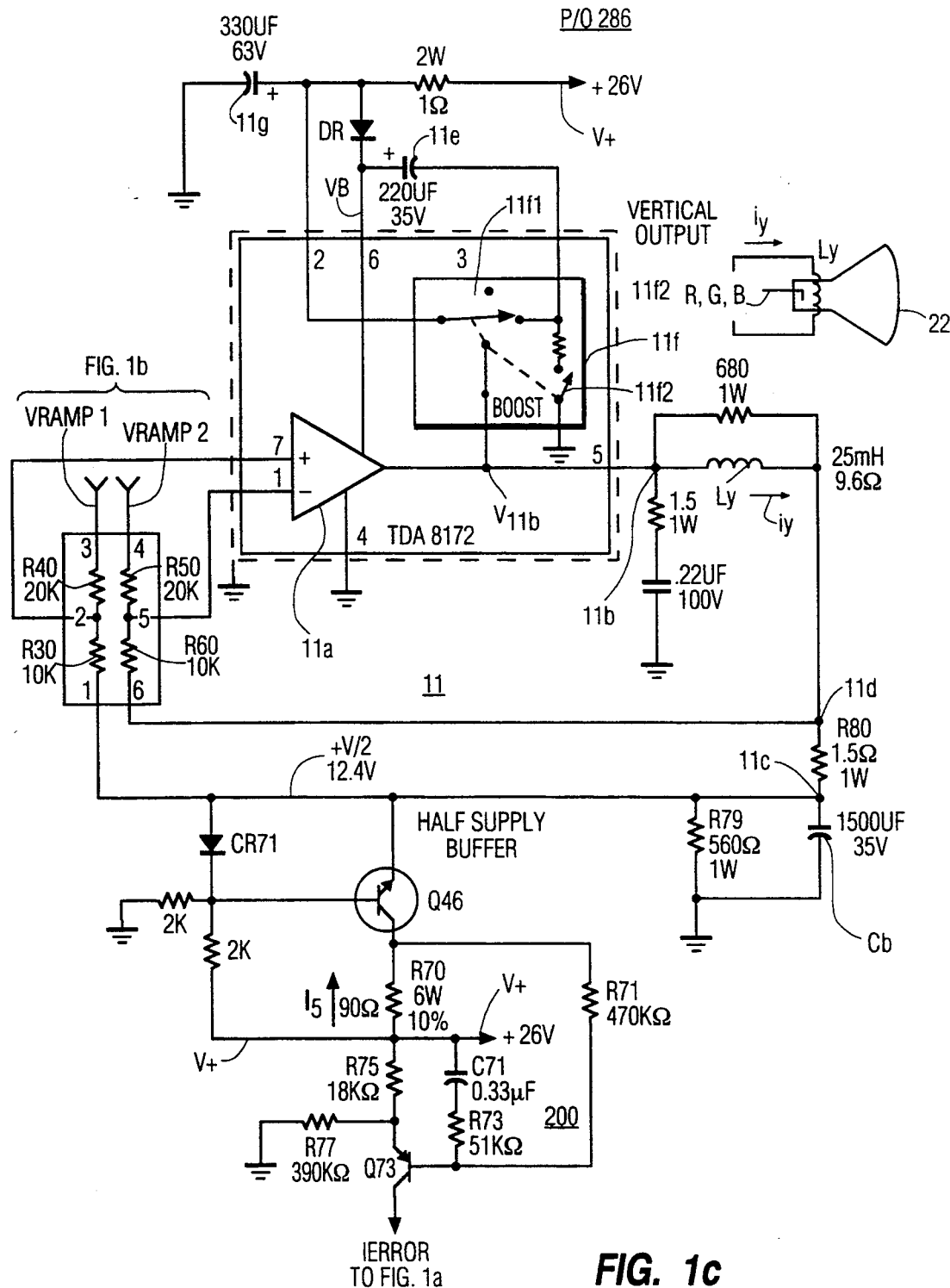

A sawtooth generator 100, shown in detail in FIG. 1b, of a vertical deflection circuit 286 controlled as to image or picture height and centering via a microprocessor controller and retrace triggering arrangement, as shown in FIG. 1a, producing a vertical deflection current iy that is coupled to a vertical deflection coil or winding Ly via an output stage, as shown in FIG. 1c. Corresponding symbols and numerals are used throughout the figures for corresponding signals, items or functions.

A vertical synchronizing signal SYNC of FIG. 1a is coupled to a vertical timing generator 10. Signal SYNC is produced by a video detector 9 of a television receiver that processes a baseband television receiver signal SNTSC, for example conforming to the NTSC standard. The elapsed time between consecutive occurrences of SYNC in signal SNTSC accounts for a vertical interval equal to 262½ horizontal video line intervals that define a given picture image or field. Generator 10 includes a microprocessor 10a, shown in FIG. 1a, that generates a vertical cycle synchronizing pulse signal A for triggering vertical reset.

FIGS. 2a–2e illustrate waveforms useful for explaining the operation of the circuit of FIGS. 1a–1c. Similar symbols and numerals in FIGS. 1a–1c and 2a–2e indicate similar items or functions.

Under user control, for example via a remote controller, not shown in FIG. 1a, microprocessor 10a of FIG. 1a generates pulse signal A, as shown in FIG. 2a, that is delayed by a controllable amount TD relative to pulse signal SYNC as seen in FIG. 2e. By delaying the occurrence of vertical reset relative to the SYNC pulse, microprocessor 10a controls panning of the picture on the screen. The delay may be, for example, a small fraction of the vertical interval between occurrences of SYNC for top panning, or a larger fraction less than a full interval, for bottom panning, or anywhere in between. The amount by which pulse signal A of FIG. 2a is delayed varies in accordance with the degree of panning that is required by the user.

Signal A of FIG. 1a is coupled by a resistor R73 to a trigger input of a pulse stretcher flip-flop U07, for generating a vertical reset signal VRESET. A logical OR function with an input signal D is provided by a transistor Q04, for controlling the timing of vertical reset signal VRESET in a zoom mode of operation. The base of transistor Q04 is coupled to input signal D, generated according to FIG. 1c, from an error current indicative signal IERROR. Signal IERROR represents the difference between a reference current level and an average vertical deflection current generated from a power supply energizing the vertical output stage.

As explained more fully later on, error current signal IERROR provides a ramping input voltage, represented by signal D, at the leading edge of a vertical blanking pulse B (see FIGS. 2b, 2d and 3e). When the ramping input voltage of signal D reaches the threshold of the triggering input of one-shot U07, signal VRESET is generated at a signal line C. A leading edge LEVRESET of pulse signal VRESET, shown in FIG. 2c, initiates vertical retrace. Vertical retrace is thus controlled to occur earlier or later as a function of the difference between the deflection current produced by the power supply and the reference level. The circuit minimizes the DC current loading of a half supply arrangement by equalizing the time during which the vertical deflection current is at its extremes following the vertical trace. The circuit responds adaptively to variations in the amount of time between the end of the vertical trace ramp and the next occurrence of SYNC in the input video signal, that result from variations in the amount of zoom and the corresponding variations in the slope of the vertical trace ramp.

Immediately after a trailing edge TEVRESET of signal VRESET, a transistor U01A of FIG. 1b becomes nonconductive. A DC current IURAMP through a collector of a transistor U06A of a voltage-to-current (V/I) converter 21, then charges a capacitor C03 to produce a voltage ramp that defines the trace portion TRACE of a vertical deflection sawtooth signal VSAW, shown in FIG. 1b. The slope of ramp portion TRACE of deflection signal VSAW is determined by the magnitude of controllable collector current IURAMP of transistor U06A.

V/I converter 21 is controlled by an analog voltage ZOOM which services as an image scale factor control signal. Voltage ZOOM is generated by a digital-to-analog (D/A) converter 10a1 coupled to microprocessor 10a as shown in FIG. 1a. Voltage ZOOM represents the degree of zoom required by the user, and is arranged in the circuit to vary the rate of change of a vertical deflection current iy applied to vertical deflection winding Ly as shown in FIG. 1c.

Voltage ZOOM of FIG. 1b is coupled via a resistor R49 of FIG. 1b to the emitter of a current control transistor Q07. An adjustable voltage V-SIZE, that may be adjusted manually using a potentiometer (not shown), or under control of microprocessor 10a is coupled via a resistor R22 to the emitter of transistor Q07 for picture height service adjustment purposes. In addition, a DC supply voltage of +12 V is coupled to the emitter of transistor Q07 via a resistor R21. The base of transistor Q07 is coupled to a diode CR02 that develops a temperature compensating base voltage equal to the forward biased voltage of diode CR02. The voltages that are coupled via resistors R21, R22 and R49 produce a collector current in transistor Q07 that controls the voltage at the base of current source transistor U06A. The base voltage of transistor U06A, determined by the collector current of transistor Q07, is developed in a series arrangement of a temperature compensating transistor U06C, whose base and collector are coupled to function as a diode, and a resistor R14 that is coupled to a −9 V supply.

A resistor R16 is coupled between the emitter of transistor U06A and the −9 V supply voltage. A transistor U06B has a base voltage that is equal to the base voltage of transistor U06A. A potentiometer resistor R43 is coupled between the emitter of transistor U06B and the −9 V voltage supply. A resistor R18 is coupled between the emitter of transistor U06A and an adjustable moveable contact TAP of resistor R43.

When contact TAP is moved close to the junction of the emitter of transistor U06B and resistor R43, resistor R18 has no effect on the emitter current in transistor U06A because the emitter voltage of transistor U06B is equal to that of transistor U06A. On the other hand, when contact TAP is adjusted closer to the −9 V supply, resistor R18 is coupled more in parallel with resistor R16. Potentiometer resistor R43 thereby adjusts the current gain of V/I converter 21 to enable compensation for tolerances of capacitor C03, producing the sawtooth voltage of signal VSAW as current is drawn by transistor U06A.

Voltage signal VSAW from capacitor C03 is coupled to the base of a transistor U01B. Transistor U01B is coupled with a transistor U01C to form a differential pair. The base of transistor U01C is coupled to one terminal of a resistor R09, having an opposite terminal at ground potential. A transistor U02A draws a current I0, setting the voltage at the base of transistor U01C through resistor R09. The base voltage of transistor U01C tracks variation of height adjustment voltage V-SIZE so as to maintain vertical centering.

To develop current I0 through transistor U02A in FIG. 1b, a second V/I converter 21A, similar to V/I convertor 21, is utilized. A transistor Q09 produces a collector current that tracks the collector current in transistor Q07, when an adjustment in height adjustment voltage V-SIZE is made. Voltage V-SIZE is coupled to the emitters of transistors Q07 and Q09 via resistors R22 and R56, respectively. The bases of transistors Q09 and Q07 are coupled at the cathode of diode CR02 and are at equal voltage. Transistor U02B and resistor R06 form a temperature compensated main load with respect to the collector current of transistor Q09. A similar load with respect to the collector current of transistor Q07 is formed by the network of transistor U06C and resistor R14. Transistor U02A of V/I converter 21A produces current I0.

Advantageously, current I0 tracks variations in current IURAMP of transistor U06A in a way to maintain vertical centering unaffected when a change in height adjustment voltage V-SIZE occurs. The tracking occurs because of circuit symmetry, for example, the symmetry with respect to transistors U06A and U02A. A transistor U02C produces the emitter currents of transistors U01C and U01B. An emitter resistor R17 establishes the value of a base voltage-to-collector current ratio in transistor U02A. A resistor R49A couples a voltage CENTER, generated in a D/A converter 10a2 of FIG. 1a, to the emitter of transistor Q09 of FIG. 1b. Voltage CENTER is controlled in a manner to produce approximately equal collector currents in transistors Q09 and Q07 when the zoom mode is not selected. Voltage CENTER compensates for a non-zero offset value of voltage ZOOM when the zoom mode is not selected.

The base voltage of transistor U01C of FIG. 1b is controlled by current I0. The values of resistor R09 and current I0 are selected such that the base voltage of transistor U01C is equal to the level of voltage VSAW at the base of transistor U01B at the vertical center, when the regular (non-zoom) mode is selected. Advantageously, as a result of tracking between V/I converters 21 and 21A, any change in size adjustment voltage V-SIZE and in the 12 V supply voltage does not affect a ratio between currents I0 and IURAMP. The resulting variations in currents I0 and IURAMP maintain the base voltage of transistor U10C at the level of sawtooth voltage signal VSAW that corresponds to vertical center for each level of voltage V-SIZE and of the 12 V supply voltage. Therefore, vertical centering is, advantageously, unaffected by adjustment of voltage V-SIZE that is used for adjusting picture height. The emitters of transistors U01B and U01C are coupled via emitter resistors R07 and R08, respectively, to the collector of transistor U02C that controls the sum of the emitter currents. The base voltage of transistor U02C is the same as that of transistor U02A. The emitter voltage of transistor U02C produces an emitter current in transistor U02C that is determined by a resistor R05.

FIGS. 3a-3f illustrate waveforms useful for explaining the operation of the arrangement of FIGS. 1a-1c. Similar symbols and numerals in FIGS. 1a-1c, 2a-2c and 3a-3f indicate similar items or functions. During vertical trace in the zoom mode, such as during interval t0-t1 in FIG. 3b, transistors U01B and U01C of FIG. 1b form a differential amplifier. The collector currents of transistors U01B and U01C develop, in corresponding collector resistors, sawtooth voltages that are coupled via emitter follower transistors 71 and 70 to develop sawtooth signals VRAMP2 and VRAMP1, respectively.

Signals VRAMP1 and VRAMP2 of FIGS. 3b and 3c, respectively, are complementary signals that change in opposite directions during the vertical trace interval t0-t1. The waveforms of FIGS. 3b and 3c that are drawn in solid line occur in the zoom mode of operation, for comparison with the waveforms in dashed line, occurring in the regular or non-zoom mode of operation. An even greater degree of zoom is shown in dash-dot line. Vertical trace occurs between, for example, time t0 and t1 when the zoom mode is selected, and between time t0 and time t2 when the zoom mode is not selected, as shown in the waveforms of FIGS. 3a-3d.

A DC coupled deflection circuit 11 of FIG. 1c, is controlled by signals VRAMP1 and VRAMP2. In circuit 11, deflection winding Ly provides vertical deflection in a cathode ray tube (CRT) 22, for example of the type W86EDV093X710, having an aspect ratio of 16×9.

Winding Ly is coupled in series with a deflection current sampling resistor R80. Winding Ly and resistor R80 of FIG. 1c form a series arrangement that is coupled between an output terminal 11b of an amplifier 11a and a junction terminal 11c of a power supply decoupling capacitor Cb. A current limiting resistor R70 couples a supply voltage V+, for example +26 volts, to terminal 11c via an emitter follower transistor Q46. Transistor Q46 produces a DC voltage +V/2 at terminal 11c that is equal to about one half of voltage V+, in particular about +12.4 volts. Half supply voltage +V/2 is determined by coupling the base of transistor Q46 to the junction of voltage dividing resistors R91 and R92. A junction terminal 11d, coupled between winding Ly and resistor R80, is coupled via a feedback resistor R60 to an inverting input terminal of amplifier 11a. Terminal 11c of resistor R80 is coupled via a resistor R30 to a noninverting input terminal of amplifier 11a. A negative feedback voltage is developed across resistor R80, representing the current in deflection coil Ly, and is applied to the input terminals of amplifier 11a. Amplifier 11a develops an output voltage as needed to cause deflection coil current iy to track the voltage drive signal applied to the amplifier, as derived from sawtooth voltage signal VSAW by way of complementary voltage signals VRAMP1 and VRAMP2.

Complementary sawtooth signals VRAMP1 and VRAMP2 are coupled via resistors R40 and R50, to the noninverting and inverting input terminals, respectively, of amplifier 11a for controlling deflection current iy. Differences between signals VRAMP1 and VRAMP2 due to component mismatch or offset voltage tolerances, for example, are compensated by a potentiometer 88 that is coupled between the collectors of transistors U01B and U01C. The vertical trace portion of deflection current iy begins at time t0, shown in FIGS. 3e and 3f, when signals VRAMP1 and VRAMP2 begin to ramp from one extreme toward the other.

When top panning is utilized, signal VRESET of FIG. 2c is produced from or synchronized to vertical synchronization pulse signal SYNC, shown in FIG. 2e. Signal SYNC is associated with the picture information that follows signal SYNC in signal SNTSC, and occurs immediately prior to an image interval IMAGE of signal SNTSC. Image interval IMAGE of FIG. 2e contains the picture information that is to be presently displayed on CRT 22 of FIG. 1c. The vertical trace portion of deflection current iy begins after the same delay time relative to the vertical sync pulse (which can be changeable when varying the extent of vertical panning), in each successive field or image interval. As a result, deflection current iy of FIG. 1c is properly synchronized in each period. Therefore, advantageously, field-to-field variations of sync signal SYNC will not cause vertical position jitter of the displayed picture.

FIG. 3a illustrates in solid line deflection current iy waveform when a first exemplary amount of zoom is selected, and in dash-dot line the deflection current for a higher degree of zoom. The non-zoom regular mode is shown by a dashed line wherein the trace portion of the deflection current occupies most or 15.7 mS of the 16.7 mS interval between successive occurrences of SYNC. FIGS. 3b-3d illustrate respective voltages using the same line conventions, and FIG. 3e is specific to the amount of zoom shown in solid line in FIGS. 3a-3d. FIG. 3f illustrates schematically an example of the timing diagram of signal SNTSC of FIG. 1a, for the first exemplary amount of zoom. An interval 301 of interval IMAGE in FIG. 3f would contain the picture information for the top half of the picture displayed in a non-zoom mode of operation. An interval 300 contains the picture information of the bottom half of such picture.

Signal SYNC, occurring at the time shown in FIG. 3f, controls the beginning time of vertical trace in this top-panning mode. Vertical trace therefore begins, in each vertical field, at time t0. A top panning mode of operation is obtained when a bottom portion of the displayed picture is cropped by a greater amount than a top portion. Thus, the example of FIGS. 3a-3f depicts maximum top panning. This is so because a video line TOP that is the first video line of interval 301 of FIG. 3f capable of providing picture information in the non-zoom mode of operation is also the first video line to provide the picture information in the maximum top panning mode.

In non-zoom operation, the beginning time t0 of a trace portion of current iy of FIG. 3a, shown in dashed line, may be delayed slightly less in order to keep the same video picture element at the top of the screen. The difference in delay compensates for the difference that occurs in the beginning of vertical trace, between the rate of change of current iy of FIG. 3a in the zoom mode of operation and that in the regular, non-zoom mode of operation.

Current limiting resistor R70 is coupled to voltage V+ for generating, via transistor Q46, half supply voltage +V/2 at terminal 11c, as explained before. The average or DC current through current limiting resistor R70 is reduced so that a large resistance can be used. The large value of resistor R70 prevents excessive deflection current iy if a fault condition occurs. Referring to FIG. 3a, in the zoom mode, reducing the average DC current in resistor R70 is accomplished by adjusting the timing of leading edge of VRESET so that retrace commences at or near the midpoint of the interval between time t1, when trace is completed, and time t2, immediately prior to the beginning of the next vertical trace. Thus, the vertical retrace interval ta-tb is positioned within the nontrace interval t1-t2, but is not generally adjacent to either end point t1 or t2. By balancing the time at which the deflection current is at its opposite extremes, the average value of the deflection current is minimized.

A network 200 of FIG. 1a produces error current indicative signal IERROR that is indicative of a difference between the average value of a half supply current IS in transistor Q46 and a reference level of 13 mA. Current signal IERROR is coupled to a timing capacitor C17. Timing capacitor C17 is disabled by a timer switch Q02 and an inverter Q01, except when signal B is HIGH. Signal B is the vertical blanking signal generated by microprocessor 10a, and is HIGH during vertical trace. It is used by blanking circuitry, not shown, to blank the screen of CRT 22. In the zoom mode, the leading edge of blanking signal B occurs earlier than the vertical timing signal A, generated by the microprocessor to initiate a new vertical trace in the non-zoom mode.

Current signal IERROR produces in capacitor C17 voltage signal D as shown in FIG. 2d (see also FIG. 3e), that ramps upwardly at a rate proportional to current signal IERROR. Timing signal D is coupled via transistor Q04 to a threshold input of one-shot integrated circuit (IC) U07. When the buffered ramp exceeds the threshold level, the set input of the flip-flop FF in IC U07 triggers, causing the Q output of flip-flop FF to go high and the low-true output at pin 3 to go low. This low-true output is coupled to the base of a transistor Q10, which clamps signal VRESET high, initiating a fast vertical retrace by clamping voltage signal VSAW via transistor U01A in FIG. 1b. Simultaneously, the output of the flip-flop in IC U07 turns on a transistor Q11 to discharge timing capacitor C17. Current signal IERROR maintains the DC component of the deflection current small in a negative feedback manner.

Timer IC U07 remains clamping signal VRESET to the HIGH state, until vertical blanking signal B from microprocessor 10a drops below the trigger input voltage of IC U07. The trigger input of IC U07 is also arranged to be coupled to a comparator U7b which triggers at about 1.7 volts. When this occurs, signalling the beginning of a new vertical trace, output pin 3 of IC U07 again goes HIGH, releasing the clamping of signal VRESET and allowing signal VSAW to begin a new trace ramp. Simultaneously, IC U07 releases discharge pin 7, enabling timer capacitor C17 for timing during the next vertical blanking pulse B.

Vertical timing signal A from microprocessor 10a is OR'ed with timing ramp signal D via resistor R73, coupled to the threshold input of IC U07 and the emitter of buffer transistor Q04. In the non-zoom mode of operation, timing ramp signal D may not reach the threshold level at the input of IC U07 before the leading edge of vertical timing signal A. In that mode, the leading edge of timing signal A sets the flip-flop in IC U07 and initiates clamping by signal VRESET of signal VSAW synchronously with the leading edge of timing signal A.

Signal VSAW as shown in FIG. 3d continues to ramp downwardly during the beginning of the blanking interval; however, signals VRAMP1 and VRAMP2 level out at the saturation voltages of the differential amplifier arrangement of FIG. 1b, e.g., at about 2.3 and 4.3 volts, respectively. At the leading edge of signal VRESET, signal VSAW is clamped high by transistor U01A, causing signals VRAMP1 and VRAMP2 to switch to their opposite states. Deflection amplifier 11a in FIG. 1c then ceases operating in a linear feedback mode and a voltage VB at supply terminal 6 of amplifier 11a is applied to deflection winding Ly via output terminal 11b. A retrace voltage V 11b is produced immediately after time ta in FIG. 3a, to enable deflection current iy to complete retrace by time tb. Switch 11f1 in FIG. 1c of a boost stage 11f causes a capacitor 11g to be coupled in series with a boost capacitor 11e. Capacitor 11e is charged via a diode X and a switch 11f2 from the +26 V supply voltage V+, during vertical trace. A supply voltage, developed across filter capacitor 11g, is summed up with a voltage developed across boost capacitor 11e so as to form boost voltage VB. Voltage VB is decoupled from the +26 V supply voltage V+ via a diode DR, when boost voltage VB is formed. During the short interval ta-tb in FIGS. 3a and 3e, retrace portion RETRACE of current iy is produced. Electromagnetic energy stored in deflection winding Ly of FIG. 1c due to current iy is used in the boost circuit, shown schematically as switch 11f, to generate the vertical retrace voltage V 11b at terminal 11b of FIG. 1c that is larger than voltage V+, causing a fast retrace.

Near time tb, deflection current iy has increased in value to a point which permits linear operation of amplifier 11a. Feedback from resistor R80 enables the deflection current to follow the flat top portions of signals VRAMP1 and VRAMP2 between times tb and t2. At the end of signal VRESET, namely at the trailing edge of blanking signal B at time t2, deflection amplifier 11a of FIG. 1c, operating in its linear feedback mode, again produces the sawtooth trace portion of deflection current iy.

Figure 7:
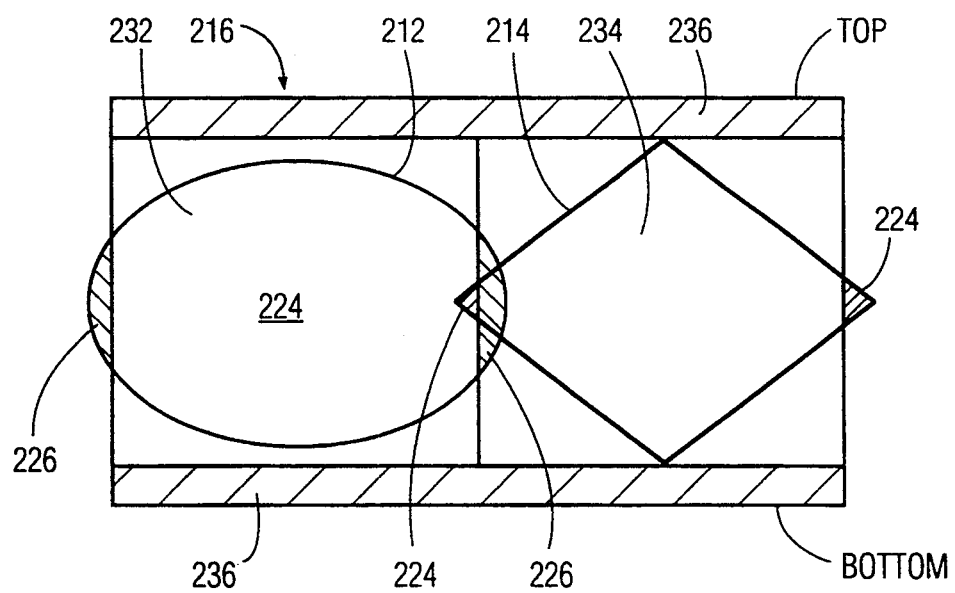
FIG. 7 illustrates a screen of a cathode ray tube operating in a vertical shrink mode for displaying two 4×3 aspect ratio pictures in a 16×9 aspect ratio display such that portions of the two pictures are cropped.

Side by side display of images intended for display in a 4×3 aspect ratio format can be obtained in a 16×9 display, screen 224 as shown in FIG. 7, by horizontal time compression and/or cropping and reducing the vertical picture height. This forms two shorter side by side pictures 232 and 234, bordered top and bottom by horizontal dark bars 236. It can be easily seen that not much subject matter is cropped from the pictures. In FIG. 7, the vertical display height is reduced to approximately 7/9 (approximately 78%) of the nominal vertical display height. The format display ratio of each picture 232 and 234 is 8:7.

Figure 8:
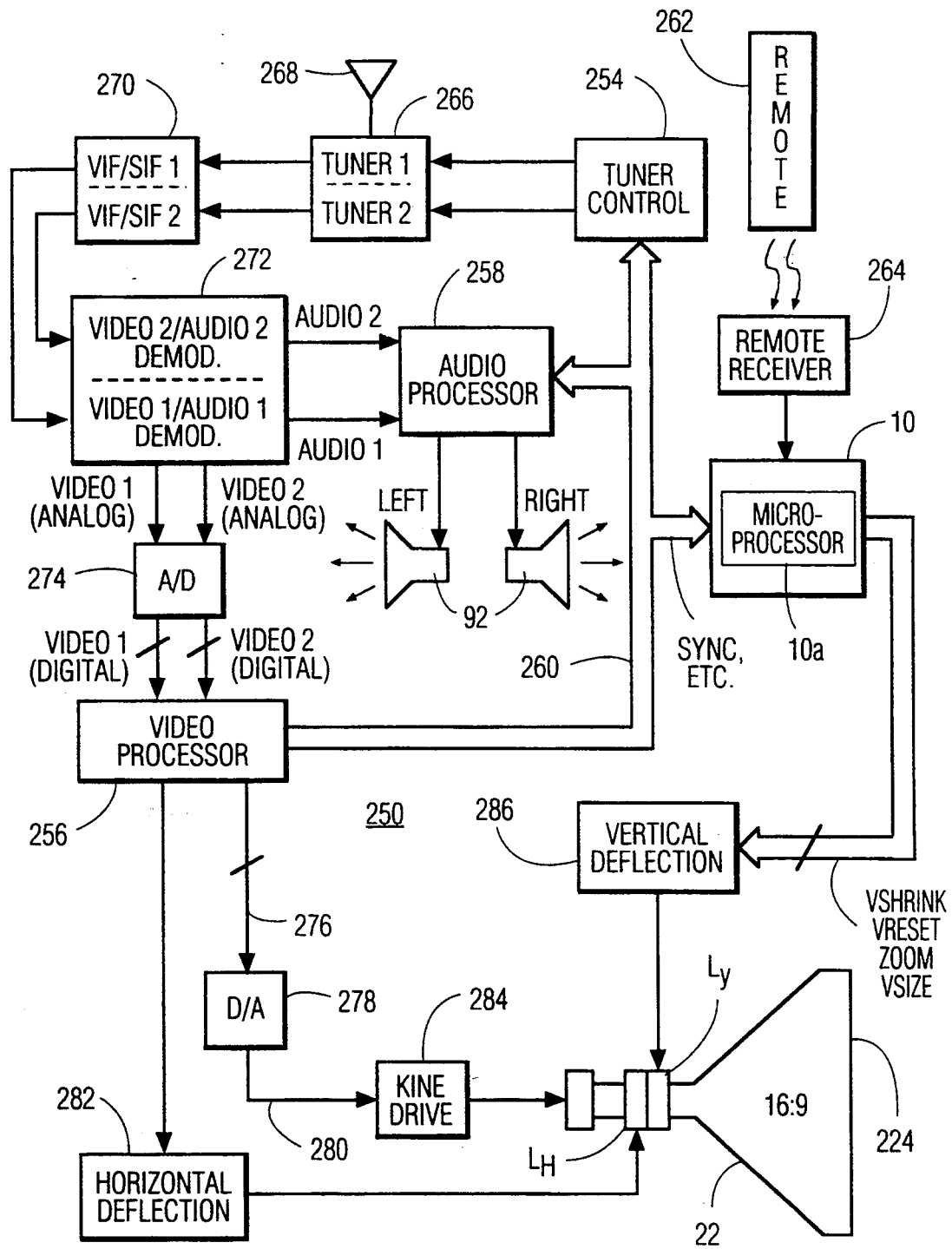
FIG. 8 illustrates a block diagram of a television receiver arrangement that includes the arrangement of FIGS. 1a–1c for obtaining the images shown in FIG. 7.

FIG. 8 illustrates a block diagram showing elements required to effect a side by side multi-picture display, and includes the same reference numbers and symbols as in FIGS. 1a-1c, 2a-2e, 3a-3f and 7 for corresponding elements. A television apparatus or receiver 250 of FIG. 8 has CRT 22 of FIG. 1c forming display screen 224 of FIG. 7. Television apparatus 250 is controlled by microprocessor 10a, which communicates with a tuner control 254, a video processor 256 and an audio processor 258 through a control and data bus 260. Microprocessor 10a is subject to viewer commands, for example generated by a remote control unit 262, the output of which is sensed by a remote control receiver 264.

A dual tuner circuit 266, responsive to signals captured by antenna 268, or other signal sources, not shown, is responsive to tuner control 254. A VIF/SIF stage 270 and a video/audio demodulator stage for each of the tuners are also provided. First and second video signals in analog form are inputs to an analog to digital converter 274. First and second digitized video signals are inputs to the video processor 256. The video processor utilizes digital signal processing techniques to generate a video output signal which has subject matter from each of the sources in side by side format. The video processor also decodes and regenerates a horizontal synchronizing signal and vertical synchronizing signal SYNC that is coupled to microprocessor 10a of generator 10. Vertical deflection circuit 286 is synchronized with the first video signal. In this regard, the designations of the video signals as first and second is arbitrary. In accordance with published techniques, the second video signal can be stored on a field by field or frame by frame basis in order to be synchronized with the first video signal, usually in a video memory.

Horizontal compression and expansion can be accomplished by utilizing line memories, wherein data is written in and read out at different rates. The interpolator smooths data which has been compressed in the line memory and presmooths data which is to be expanded in the line memory. Vertical deflection circuit 286 enables adjustment of the vertical size of the raster, in accordance with desired amounts of vertical overscan and underscan, relative to the nominal vertical display height, as necessary for implementing different display formats.

The video processor generates a digital output signal 276, which includes side by side pictures. The relative amounts of horizontal compression and/or cropping will depend upon the display format and the vertical display height, responsive to the microprocessor, which is in turn responsive to user commands. The digital output signal 276 is converted to an analog output signal 280 by a digital to analog converter 278. Analog output signal 280 in an input to kine drive circuit 284, which drives cathode ray tube 22. Horizontal and vertical deflection yokes on the cathode ray tube are coupled to horizontal and vertical deflection circuits, respectively. The cathode ray tube 22 has a display screen 16, as in FIG. 7, with a wide format display ratio of 16:9.

Generator 10 generates vertical blanking/reset signals such as signal VRESET used to drive deflection circuit 286, as explained before. Generator 10 also generates a control signal VSHRINK that causes a reduced vertical deflection angle when television receiver 250 operates in the multi-picture mode, thereby reducing the vertical size of the video image to less than the available vertical size of display screen 224. This transformation of vertical deflection circuit 286 to obtain the reduced vertical deflection angle is accomplished, by changing the slope of sawtooth signal VSAW of FIG. 1b, as explained later on.

The full vertical deflection angle is selected when viewing a single picture and the reduced deflection angle is selected when viewing two pictures, side by side.

Vertical S-correction in CRT 22 of FIG. 8 or 1c is obtained as a result of operation in a nonlinear region in transistors U01C and U01B of FIG. 1b. Transistor characteristics cause the nonlinear signal gain of the differential amplifier formed by transistors U01C and U01B to be smaller, at the beginning and end of vertical trace, when the current in a corresponding one of the transistors is smaller, than at the center of trace. Thus, signals VRAMP1 and VRAMP2 are generated from voltage signal VSAW in accordance with a scale factor or gain that varies during the period of signal VSAW.

When voltage VSAW is at a peak value, the current in transistor U01C is smaller than at the center of vertical trace. Therefore, an equivalent emitter resistance of transistor U01C is larger. Consequently, the voltage gain or scale factor of the differential amplifier formed by transistors U01C and U01B is smaller than at the vertical center. Similarly, when voltage signal VSAW is at a minimum, the current in transistor U01B is smaller than at the vertical center. Therefore, an equivalent emitter resistance of transistor U01B is larger and the gain of the differential amplifier is also smaller than at the vertical center.

Figure 4:
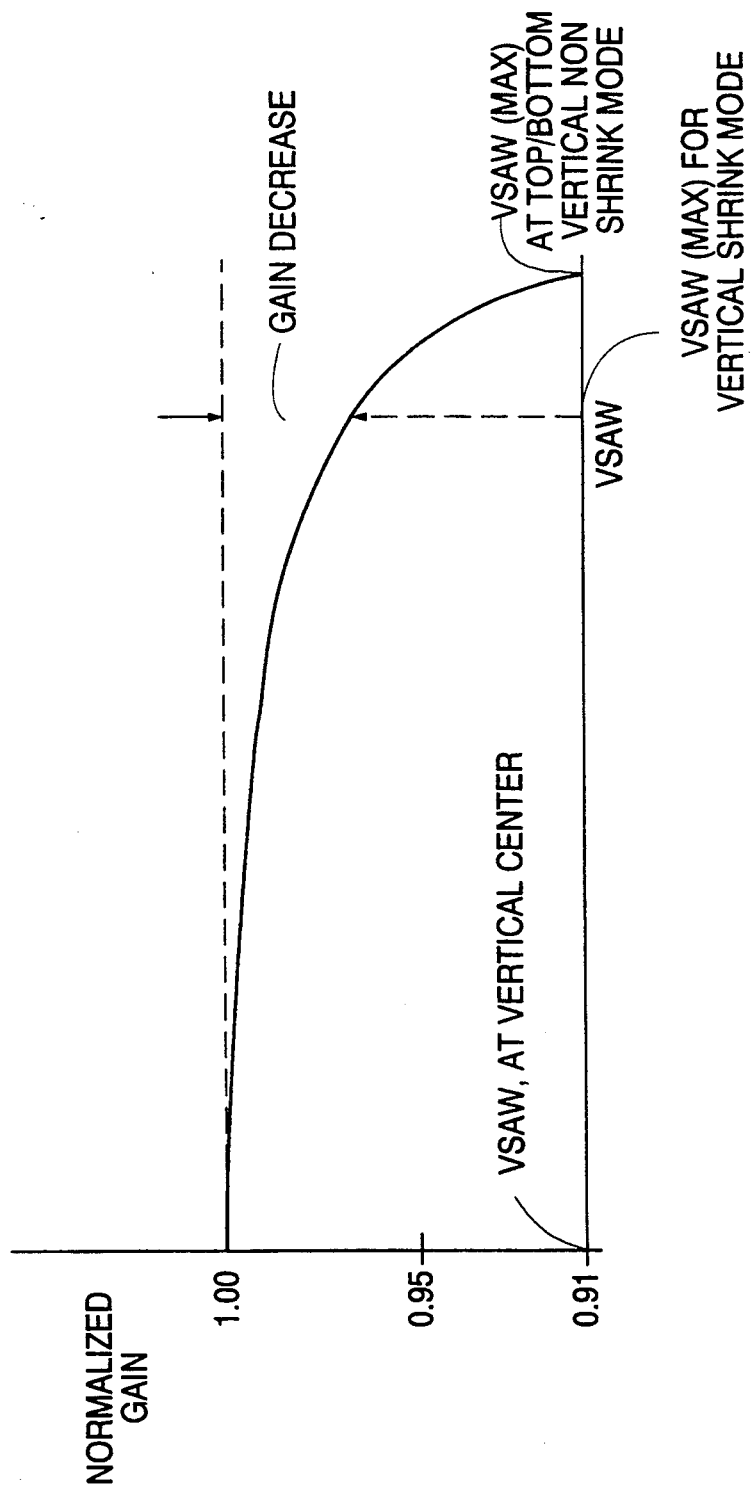
FIG. 4 illustrates in a graphical form the way a gain of a differential amplifier of FIG. 1b that provides S-correction varies as a function of input voltage.

FIG. 4 illustrates a graphical representation of the way the large signal gain of the differential amplifier formed by transistors U01B and U01C varies as a function of voltage signal VSAW of FIG. 1b. The large signal gain is normalized to a maximum value, obtained at the center of vertical trace. Thus, at the center of vertical trace, the normalized gain is equal to 1.

In the vertical non-shrink mode, when voltage signal VSAW is at a peak magnitude, at the top end or bottom end of vertical trace, the normalized gain is reduced and becomes equal to approximately 0.9. S-correction is obtained in the same manner for any degree of zoom that is selected.

Figure 5:
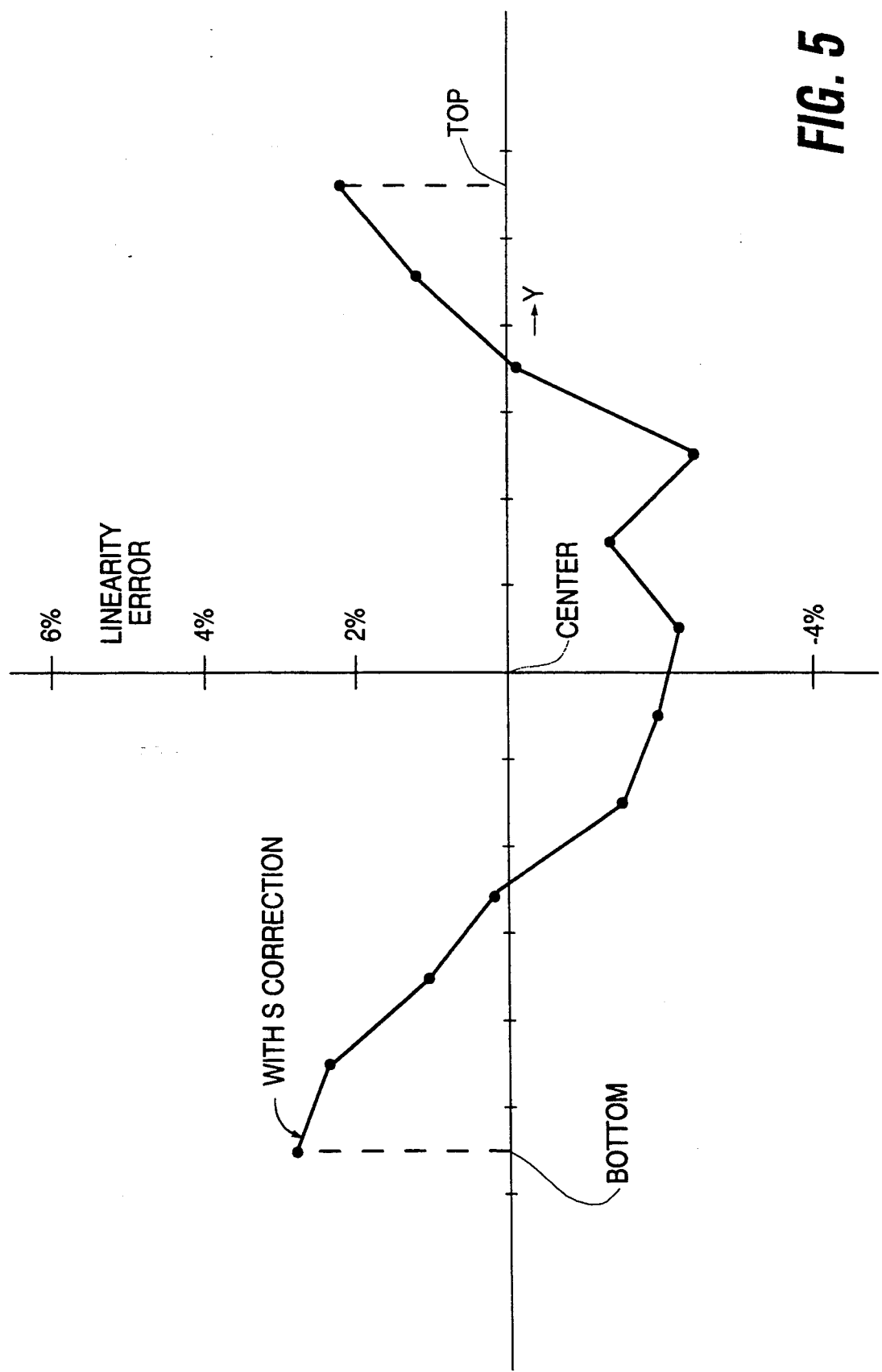
FIG. 5 illustrates in a graphical form the way linearity error changes as a function of vertical position in the arrangement of FIG. 1b.
Figure 6:
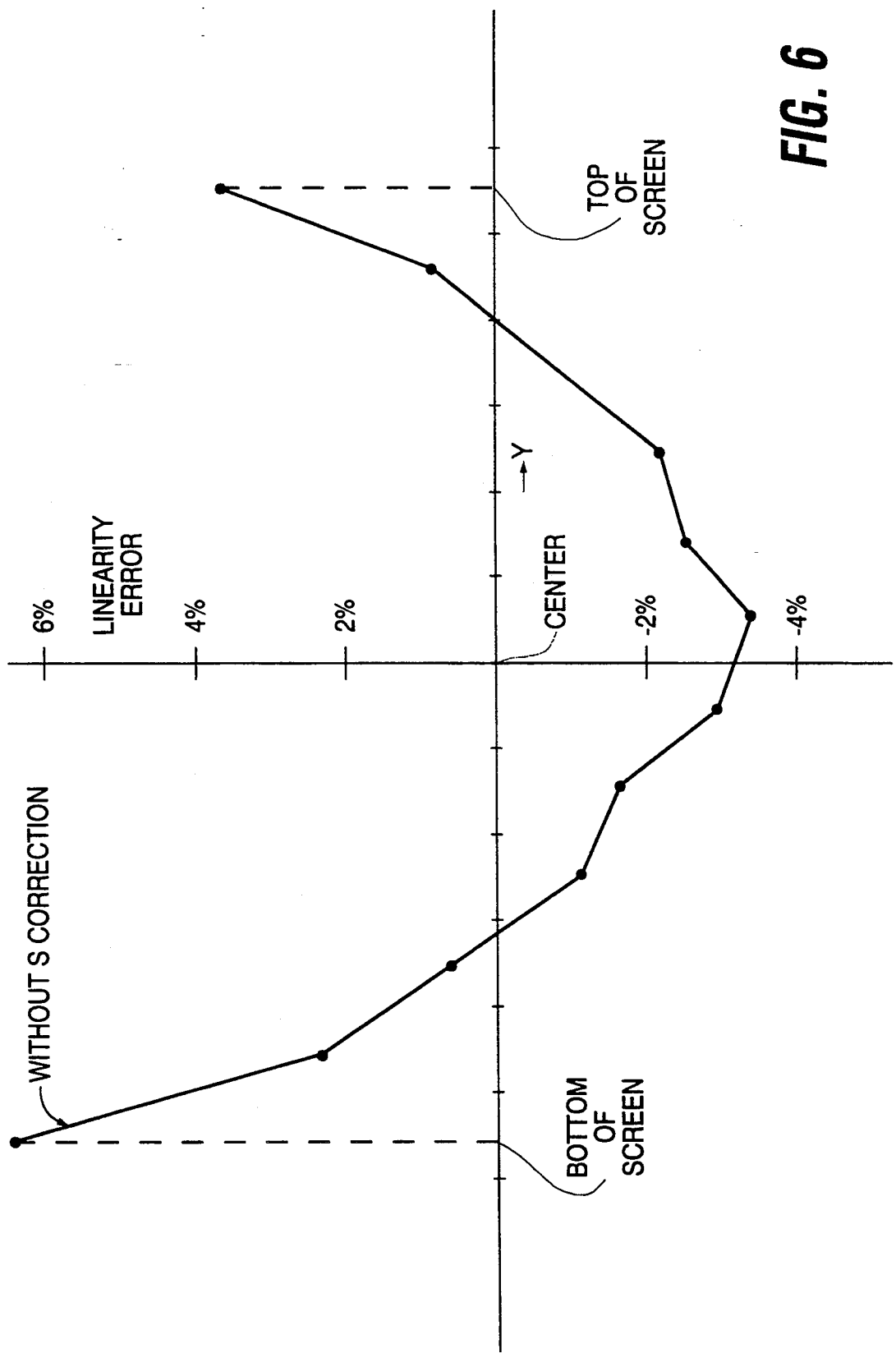
FIG. 6 illustrates in a graphical form the way the linearity error changes if S-correction were not provided.

FIG. 5 illustrates a graphical representation of the linearity error when the arrangement of FIG. 1b is utilized. For comparison purposes, FIG. 6 illustrates a graphical representation of the linearity error when transistors U01C and U01B of FIG. 1b are biased, in a manner not shown, to operate with a constant gain throughout vertical trace. Thus, FIG. 6 illustrates the situation when no S-correction is provided.

The linearity error in FIGS. 5 and 6 is shown as a function of the vertical position on the faceplate of CRT 22 of FIG. 1c. The linearity error measurement was obtained using a crosshatch pattern with 13 horizontal lines. The linearity error of a given pair of adjacent lines is obtained by measuring a vertical distance between all adjacent pairs of lines and finding the average or mean value of the vertical distances between adjacent line pairs. Linearity error is the difference between a given line pair spacing and the mean spacing divided by the mean spacing. The resulting fraction is expressed in a percentage form in FIGS. 5 and 6. Thus, in the vertical non-shrink mode, the linearity error without S-correction shown in FIG. 6 varies in a range of +6% to −3% for a total of error range of 9%. Whereas, advantageously, with the S-correction of FIG. 1b, the linearity error shown in FIG. 5 varies in a range of +2.5% to −2.5%, for a total error range of 5% that is approximately one-half the error without S-correction.

Signal V-SIZE is adjusted for obtaining a picture or vertical scan that extends the entire height or vertical size of the CRT. In service operation required to adapt a given deflection yoke to a given CRT, picture height adjustment may be obtained by varying signal V-SIZE of FIG. 1b for controlling the amplitude of signal VSAW. For example, a decrease in signal V-SIZE produces a decrease in a peak amplitude of signal VSAW. The decrease in signal V-SIZE also causes a decrease in the collector currents of each of transistors U02C, U01B and U01C, because of tracking provided by the current mirror arrangement. Such tracking causes the normalized gain of the differential amplifier formed by transistors U01B and U01C to decrease when the electron beam is at the extreme top/bottom ends of the display screen.

On the other hand, the decrease in the peak amplitude of signal VSAW tends to increase the normalized gain. Thus, the aforementioned decrease in the normalized gain of the differential amplifier formed by transistors V01C and V01B compensates for the tendency to increase the normalized gain caused by the decrease in the peak value of signal VSAW. Thus, nonlinearity or S-shaping introduced in signals VRAMP1 and VRAMP2 by the differential amplifier formed by transistors V01B and V01C is less dependent on the adjustment of signal V-SIZE. Advantageously, it follows that S-correction is less dependent on adjustment of signal V-SIZE. Thus, for a given type of CRT that requires a predetermined S-shaped deflection current, S-correction is less dependent on adjustment of signal V-SIZE required for adapting the particular yoke to the particular CRT. Advantageously, S-shaping is obtained downstream in the signal path after controlling picture height in signal VSAW in accordance with signal S-SIZE. Such arrangement simplifies the deflection circuit.

When the user selects a vertical-shrink mode of operation, signal ZOOM is set via microprocessor 10a to a level that corresponds to the regular, non-zoom mode of operation. Whereas, signal VSHRINK is produced at a level of about 10 volts via an A/D converter 10a3 that is controlled by microprocessor 10a.

Signal VSHRINK is coupled to a DC voltage divider formed by a resistor RC and a resistor RD. An output voltage of the voltage divider at a terminal 121 is coupled to an emitter of a transistor QA via an emitter resistor RA and coupled to an emitter of a transistor QB via an emitter resistor RB. When signal VSHRINK is at 10 volts, resulting in operation in the vertical shrink mode, signal VSHRINK produces an emitter current in transistor QA and an equal emitter current in transistor QB. The collectors of transistors QA and QB are coupled to the emitters of transistors U06A and U02A, respectively. The 10-volt signal VSHRINK reduces an emitter current in transistor U06A and an emitter current in transistor U02A by the same amount. Signal VSHRINK causes each of currents IURAMP and IO to decrease by the same amount relative to the corresponding values in the vertical non-shrink mode of operation.

In the vertical shrink mode of operation, the required amplitude of deflection current iy of FIG. 1c and 3a is smaller so as to provide vertical scan that extends to only a portion of the entire vertical height of FIG. 8 of the display screen, for example, 20% underscan. In comparison, in each of the zoom and regular modes of operation, the amplitude of deflection current iy of FIG. 1c provides overscan of, for example, 6%. Advantageously, vertical centering is not affected because of the equal currents in transistors QA and QB of FIG. 1b. When vertical-shrink mode of operation is not activated, signal VSHRINK is at zero volts. Therefore, transistors QA and QB are non-conductive and do not affect the operation.

In accordance with an inventive feature, in the vertical-shrink mode of operation, the collector current in transistor U02C is not affected by the currents produced in transistors QA and QB. Therefore, in the vertical shrink mode, when signal VSAW of FIG. 4 corresponds to a given vertical position of the electron beam on the CRT faceplate, the normalized gain decrease or nonlinearity introduced by the differential amplifier formed by transistors U01C and U01B of FIG. 1b is the same as in the vertical non-shrink mode at the same vertical position. Thus, the normalized gain or scale factor associated with the differential amplifier formed by transistors U01C and U01B remains the same for a given instantaneous level of signal VSAW in both the vertical shrink and non-shrink modes. Advantageously, in a given vertical position, the same S-correction or linearity correction is maintained in both the vertical-shrink mode, when side-by-side picture display is employed, and in the vertical, non-shrink mode. Because signal VSHRINK is not coupled via the same signal path as signal V-SIZE, a given change in the amplitude of signal VSAW that is caused by signal V-SIZE varies the normalized gain of the differential amplifier by a smaller amount than when the given amplitude change is caused by signal VSHRINK.

What is claimed is:
1. A video deflection apparatus, comprising:
   a cathode ray tube;
   a vertical deflection winding mounted on a neck of said cathode ray tube;
   a sawtooth signal generator responsive to a first vertical size control signal for generating, selectively, in accordance with said first vertical size control signal, a first sawtooth signal at a first amplitude to provide for a vertical non-shrink mode of operation and at a second amplitude to provide for a vertical shrink mode of operation;
   a deflection amplifier responsive to said sawtooth signal for generating a vertical deflection current in said deflection winding that causes a vertical position of an electron beam to vary on a display screen of said cathode ray tube in accordance with said sawtooth signal; and
   a nonlinear element coupled to said sawtooth signal generator for varying said sawtooth signal in a nonlinear manner to provide for vertical S-correc- tion, such that a nonlinearity introduced in said sawtooth signal by said nonlinear element is the same in a given vertical position in both the vertical shrink and non-shrink modes.

2. An apparatus according to claim 1 wherein said nonlinear element comprises a pair of transistors forming differential amplifier that operates in a nonlinear region.

3. An apparatus according to claim 1, wherein said sawtooth signal generator comprises means for generating a second sawtooth signal, wherein said nonlinear element comprises an amplifier responsive to said second sawtooth signal for generating said first sawtooth signal such that said nonlinearity is introduced in said first sawtooth signal with respect to said second sawtooth signal.

4. A video deflection apparatus, comprising:
a cathode ray tube;
a vertical deflection winding mounted on a neck of said cathode ray tube;
a vertical deflection amplifier responsive to a sawtooth signal for generating a vertical deflection current in said vertical deflection winding to vary a vertical position of an electron beam on a screen of said cathode ray tube;
a sawtooth signal generator responsive to a first control signal and to a second control signal for generating said sawtooth signal having an amplitude that is controlled in accordance with each of said control signals;
a nonlinear element responsive to said sawtooth signal and coupled to said deflection amplifier for controlling said deflection current to provide for S-correction, said nonlinear element being responsive to one of said control signals for varying a nonlinearity of said deflection current such that when a change in said first control signal produces a given change in said amplitude of said sawtooth signal the nonlinearity varies by a different amount than when a change in said second control signal produces said given amplitude change.

5. An apparatus according to claim 4 wherein said first control signal provides for service picture height adjustment and said second control signal provides for vertical shrink/non-shrink mode of operation.

6. An apparatus according to claim 5 wherein when said first control signal produces said given change the nonlinearity varies by a smaller amount than when said second control signal produces said given change.

7. A video deflection apparatus, comprising:
a cathode ray tube;
a vertical deflection winding mounted on a neck of said cathode ray tube;
a vertical deflection amplifier responsive to a sawtooth signal for generating a vertical deflection current in said vertical deflection winding to vary a vertical position of an electron beam on a screen of said cathode ray tube;
a sawtooth signal generator responsive to a first control signal and to a second control signal for generating said sawtooth signal having an amplitude, that is controlled in accordance with each of said control signals;
a nonlinear amplifier responsive to said sawtooth signal and coupled to said deflection amplifier for controlling said deflection current such that a ratio between a gain of said amplifier at a given vertical position and a gain of said amplifier at a predetermined reference vertical position varies in accordance with said sawtooth signal in a manner to provide for S-correction, said amplifier being responsive to one of said control signals for varying said ratio by different amounts when a change in said amplitude of said sawtooth signal is caused by a change in said first control signal than when it is caused by a change in said second control signal.

8. A video deflection apparatus, comprising:
a cathode ray tube;
a vertical deflection winding mounted on a neck of said cathode ray tube;
a sawtooth signal generator responsive to a vertical shrink control signal for generating, selectively, in accordance with said vertical shrink control signal, a sawtooth signal at a first amplitude to provide for a vertical non-shrink mode of operation and at a second amplitude to provide for a vertical shrink mode of operation; and
a deflection amplifier responsive to said sawtooth signal for generating a vertical deflection current in said deflection winding that causes a vertical position of an electron beam to vary on a display screen of said cathode ray tube in accordance with said sawtooth signal such that said sawtooth signal is DC-coupled to said deflection winding to form a DC-coupled vertical deflection circuit.

* * * * *